(12) United States Patent
Park et al.

(10) Patent No.: US 10,381,614 B2
(45) Date of Patent: Aug. 13, 2019

(54) BATTERY MODULE

(71) Applicant: SAMSUNG SDI CO., LTD., Yongin-si, Gyeonggi-do (KR)

(72) Inventors: Shi-Dong Park, Yongin-si (KR); Jun-Woo Cho, Yongin-si (KR); Young-Deok Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 249 days.

(21) Appl. No.: 14/198,208

(22) Filed: Mar. 5, 2014

(65) Prior Publication Data

US 2014/0315070 A1  Oct. 23, 2014

Related U.S. Application Data

(60) Provisional application No. 61/813,134, filed on Apr. 17, 2013.

(51) Int. Cl.
*H01M 2/10* (2006.01)
*H01M 2/02* (2006.01)
*H01M 2/04* (2006.01)

(52) U.S. Cl.
CPC .......... *H01M 2/1077* (2013.01); *H01M 2/02* (2013.01); *H01M 2/04* (2013.01); *H01M 2200/00* (2013.01); *H01M 2220/20* (2013.01)

(58) Field of Classification Search
CPC .......... H01M 2/1077; H01M 2200/00; H01M 2220/20; H01M 2/02; H01M 2/04
USPC ....................................................... 429/151
See application file for complete search history.

(56) References Cited

U.S. PATENT DOCUMENTS

| | | | |
|---|---|---|---|
| 6,982,131 B1 * | 1/2006 | Hamada | H01M 2/0237 429/148 |
| 2003/0232239 A1 | 12/2003 | Gow et al. | |
| 2006/0093899 A1 | 5/2006 | Jeon et al. | |
| 2006/0216582 A1 * | 9/2006 | Lee | H01M 2/1077 429/120 |
| 2007/0026305 A1 * | 2/2007 | Jeon | H01M 2/1077 429/159 |

(Continued)

FOREIGN PATENT DOCUMENTS

| EP | 1 126 533 A2 | 8/2001 |
|---|---|---|
| EP | 2 413 395 A2 | 2/2012 |

(Continued)

OTHER PUBLICATIONS

Machine English language translation of Fujiki Fukuo et al. in JP2006-140025—Jun. 1, 2006 (Year: 2006).*

(Continued)

*Primary Examiner* — Jonathan G Jelsma
*Assistant Examiner* — Omar M Kekia
(74) *Attorney, Agent, or Firm* — Lewis Roca Rothgerber Christie LLP

(57) ABSTRACT

A battery module includes a plurality of battery cells arranged in a same direction and a same orientation; and a housing portion disposed on the outer surfaces of the plurality of battery cells. In the battery module, the housing portion includes a reinforcing plate positioned between at least two of the battery cells. The reinforcing plate is part of the housing portion, and strengthens the housing portion, thereby enabling a lighter weight battery module and improving the safety of the battery module.

16 Claims, 10 Drawing Sheets

(56) References Cited

U.S. PATENT DOCUMENTS

| | | |
|---|---|---|
| 2010/0196749 A1 | 8/2010 | Yoshida et al. |
| 2010/0216004 A1 | 8/2010 | Yoon |
| 2011/0076521 A1* | 3/2011 | Shimizu .............. H01M 2/1061 429/7 |
| 2011/0151314 A1* | 6/2011 | Ogawa ................ H01M 2/1077 429/158 |
| 2011/0318625 A1* | 12/2011 | Yajima ................ H01M 2/1077 429/120 |
| 2012/0009455 A1* | 1/2012 | Yoon ................. H01M 10/6552 429/120 |
| 2012/0125447 A1* | 5/2012 | Fuhr .................... H01M 2/0262 137/260 |
| 2013/0052516 A1 | 2/2013 | Kim |

FOREIGN PATENT DOCUMENTS

| | | | |
|---|---|---|---|
| JP | 07-022003 | | 1/1995 |
| JP | 2002-134078 A | | 5/2002 |
| JP | 2006-140025 | * | 6/2006 ............. H01M 2/10 |
| JP | 2006-140025 A | | 6/2006 |
| JP | 2010-199070 A | | 9/2010 |
| JP | 2013-45765 A | | 3/2013 |
| KR | 10-2011-0071563 A | | 6/2011 |
| KR | 10-2012-0047800 A | | 5/2012 |

OTHER PUBLICATIONS

EPO Office action dated Jun. 5, 2015, for corresponding European Patent application 14161155.8, (8 pages).
English Machine Translation of KR 10-2011-0071563 A, 18 pages.
English Machine Translation of KR 10-2012-0047800 A, 14 pages.
EPO Search Report dated Aug. 14, 2014, for corresponding European Patent application 14161155.8,(12 pages).
EPO Office action dated Feb. 17, 2016, for corresponding European Patent application 14161155.8, (8 pages).
EPO Office Action dated Aug. 18, 2016, for corresponding European Application No. 14161155.8 (8 pages).
SIPO Office Action dated Jul. 13, 2017, for corresponding Chinese Patent Application No. 201410147986.5 (14 pages).
SIPO Office Action, with English translation, dated Mar. 19, 2018, for corresponding Chinese Patent Application No. 201410147986.5 (6 pages).
Japanese Office Action dated Apr. 2, 2018, for corresponding Japanese Patent Application No. 2014-082597 (8 pages).

* cited by examiner

BATTERY MODULE

CROSS-REFERENCE TO RELATED APPLICATION

This application claims priority to and the benefit of U.S. Provisional Application No. 61/813,134, filed on Apr. 17, 2013 in the U.S. Patent and Trademark Office, the entire content of which is incorporated herein by reference.

BACKGROUND

1. Technical Field

An aspect of the present invention relates to a battery module.

2. Description of the Related Art

A high-power battery module with high energy density that uses a non-aqueous electrolyte has recently been developed. A large-capacity battery module may be manufactured by connecting a plurality of battery cells in series, and is intended for use in driving devices that require high power output, e.g., the motors of electric vehicles and the like.

Since the number of devices employing high-power battery modules is increasing, studies have been conducted to improve the productivity of the battery module. Also, as the external appearance of these devices is diversified, the shape of the battery module needs to be variable. However, the basic safety of the battery module should also be secured. Therefore, studies on the structure of a battery module capable of satisfying all these requirements have been conducted in various fields.

SUMMARY

In some embodiments of the present invention, a battery module is light in weight and has improved safety, and these characteristics are achieved by substantially preventing deformation of the housing portion, which is generally caused by external impact.

According to an aspect of the present invention, a battery module includes: a plurality of battery cells arranged in a same direction and a same orientation; and a housing portion disposed on outer surfaces of the plurality of battery cells. The housing portion includes a reinforcing plate positioned between at least two of the battery cells.

The housing portion may include side plates respectively covering both side surfaces of the plurality of battery cells, and the reinforcing plate has both of its side surfaces respectively coupled to the side plates.

The reinforcing plate may be welded to the side plates.

A protrusion may be provided on any one of the reinforcing plate and the side plates, and a groove may be provided in the other of the reinforcing plate and the side plates. The protrusion may be inserted into the groove to couple or fix the reinforcing plate and the side plates to each other.

The reinforcing plate and the side plates may be coupled or fixed to each other by screws.

The housing portion may further include end plates adjacent to the outermost battery cells, and both side surfaces of each end plate are connected to the respective side plates.

The thicknesses of the side plates and the reinforcing plate may be identical to or thinner than the thickness of the end plate.

The housing portion may further include a bottom plate, and both side surfaces of the bottom plate may be connected to the respective side plates, thereby covering the surface of the housing portion opposite to the surface from which the electrode tabs of the plurality of battery cells are extracted.

The reinforcing plate may be welded to the bottom plate.

A protrusion may be provided on one of the reinforcing plate and the bottom plate, and a groove may be provided in the other of the reinforcing plate and the bottom plate. The protrusion may be inserted into the groove to thereby couple or fix the reinforcing plate and the side plates to each other.

The reinforcing plate and the bottom plate may be coupled or fixed to each other with screws.

The housing portion may include iron.

The housing portion may include stainless steel.

The reinforcing plate may be coupled to the side plates near a center of the plurality of battery cells.

An insulative coating layer may be formed on at least one surface of the reinforcing plate.

Other features and advantages of the present invention will become more apparent from the following detailed description, when taken in conjunction with the accompanying drawings.

Terms or words used in the present specification and claims should not be interpreted as restricted to their ordinary meanings or dictionary-based meanings, but rather should be interpreted as having the meanings defined herein, in keeping with the ability of an inventor to define terms in the way he sees fit to describe and explain his or her invention.

According to embodiments of the present invention, in the battery module, the reinforcing plate is included in the housing portion, thereby strengthening the housing portion while also improving the safety of the battery module and enabling the battery module to be light in weight.

BRIEF DESCRIPTION OF THE DRAWINGS

These and other features and advantages of the present invention will be better understood by reference to the following detailed description, taken in conjunction with the accompanying drawings, in which.

DETAILED DESCRIPTION

Figure 1:
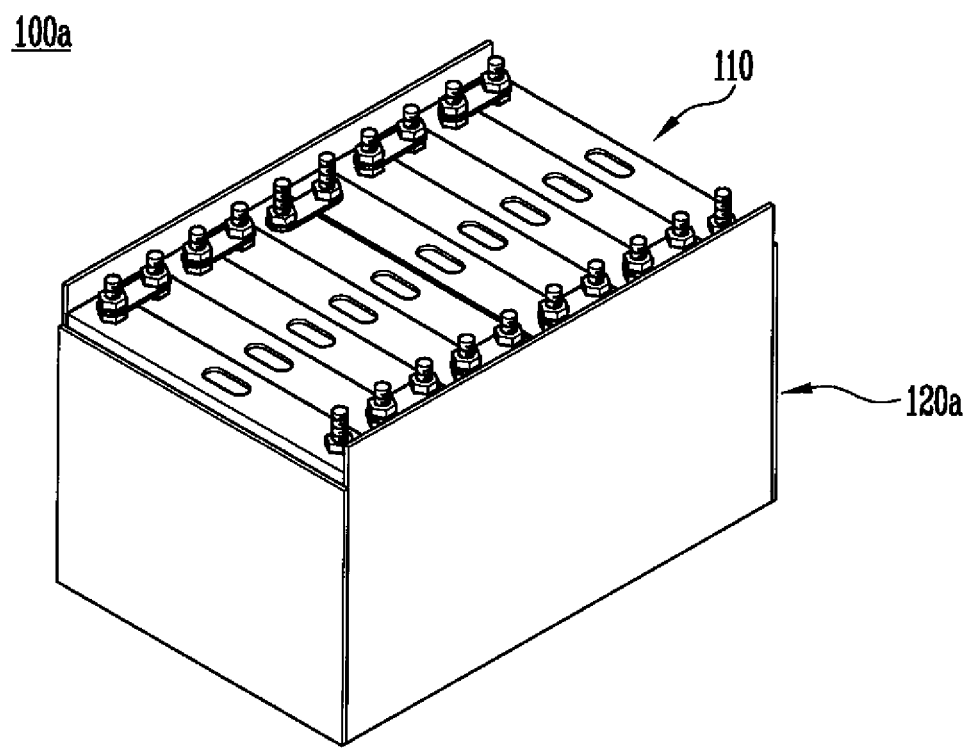
FIG. 1 is a perspective view of a battery module according to an embodiment of the present invention.

In the following detailed description, certain exemplary embodiments of the present invention are shown and described, and are presented for illustrative purposes. As those skilled in the art would realize, the described embodiments may be modified in various different ways without departing from the spirit or scope of the present invention. Accordingly, the drawings and description are to be regarded as illustrative in nature and not restrictive. In addition, when an element is referred to as being "on" another element, it can be directly on the other element or indirectly on the other element with one or more intervening elements therebetween. Also, when an element is referred to as being "connected to" another element, it can be directly connected to the other element or indirectly connected to the other element with one or more intervening elements therebetween. Also, throughout the description, like reference numerals refer to like elements.

Figure 2:
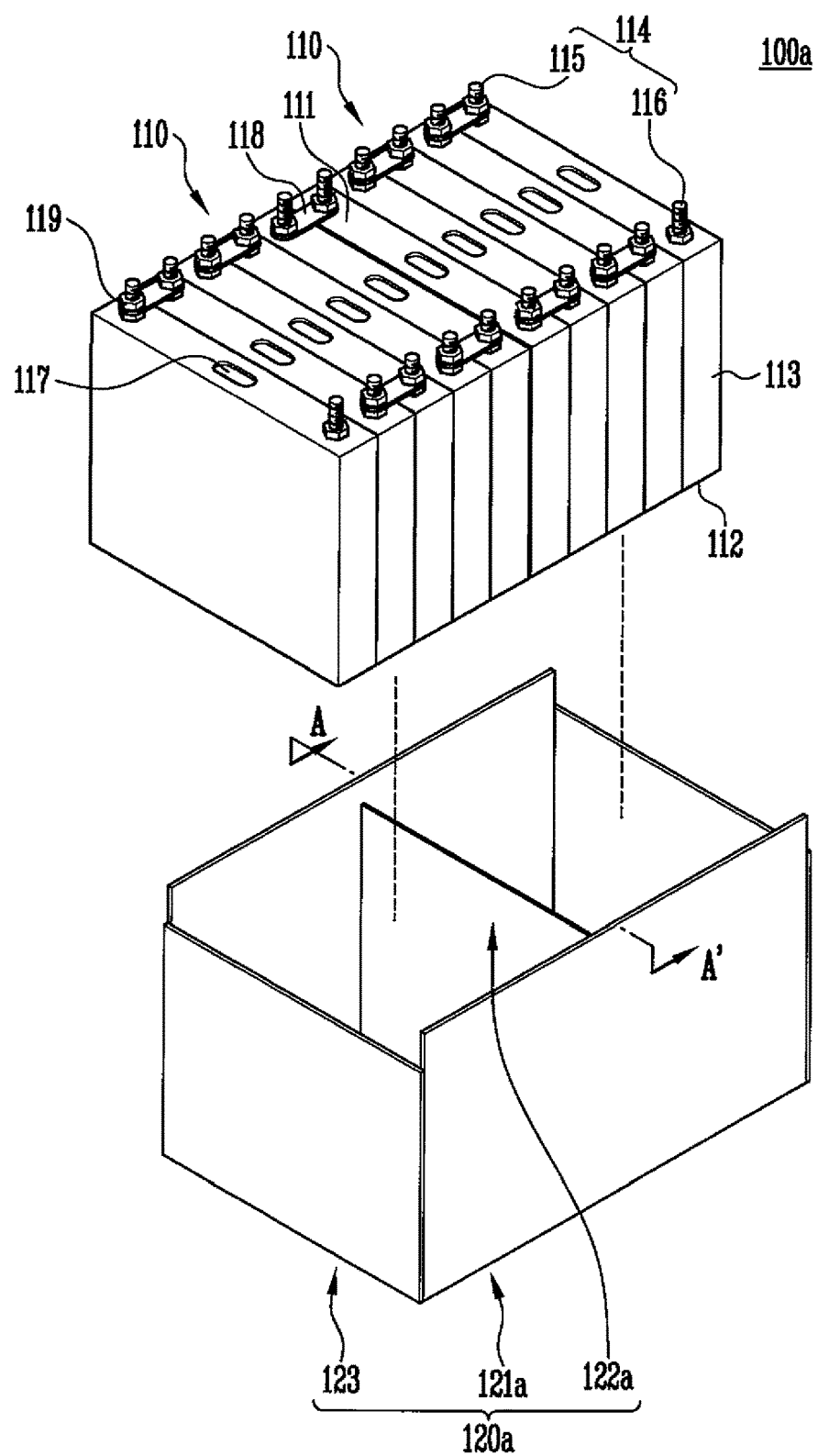
FIG. 2 is an exploded perspective view of the battery module shown in FIG. 1.

FIG. 1 is a perspective view of a battery module 100a according to an embodiment of the present invention. FIG. 2 is an exploded perspective view of the battery module 100a shown in FIG. 1. As shown in FIGS. 1 and 2, the battery module 100a according to this embodiment includes a plurality of battery cells 100 arranged in the same direction and in the same orientation. The battery module 100a also includes a housing portion 120a disposed on the outer surfaces of the plurality of battery cells 110. The housing portion 120a may include a reinforcing plate 122a positioned between at least two of the battery cells 110.

The battery cell 110 is an energy generating element, and a plurality of battery cells are aligned in the same direction and in the same orientation.

Here, each battery cell 110 may include a battery case having an opened surface. Each battery cell 110 also includes an electrode assembly and an electrolyte which are housed in the battery case. The battery cell 110 generates energy by an electrochemical reaction between the electrode assembly and the electrolyte. The battery case may be sealed, for example, by including a cap assembly on a first surface 111 of the battery cell 110. Terminals 114 having different polarities, i.e., positive and negative electrode terminals 115 and 116, may protrude from the first surface 111 of the battery cell 110. A vent 117 may also be provided as a safety means in the first surface 111 of the battery cell 110. The vent 117 serves as a passage for gas generated inside the battery cell 110 to be exhausted to the outside of the battery cell 110. The terminals 114 of adjacent battery cells 110 in the plurality of battery cells 10 may be electrically connected to each other by a bus-bar 118, and the bus-bar 118 may be fixed to the terminal portions 114, for example, by a fixing means 119, such as a nut. The battery cell 110 may include the first surface 111 from which the terminal portions 114 extend, a second surface 112 opposite the first surface 111, and side surfaces 113 that connect the first and second surfaces 111 and 112 to each other.

The housing portion 120a, as shown in FIGS. 1 and 2, is disposed on the outer surfaces of the plurality of battery cells 110 to house the plurality of battery cells 110 in the same direction and same orientation and to protect the plurality of battery cells 110 from the outside.

In some embodiments, the housing portion 120a may include, for example, two side plates 121a, two end plates 123 and a reinforcing plate 122a. The side plates 121a respectively cover both side surfaces 113 of the plurality of battery cells 110, and the end plates 123 are respectively adjacent to the outermost battery cells 110, i.e., to respectively cover the wide surfaces of the outermost battery cells 110. Thus, the housing portion 120a forms a box having opened upper and lower surfaces, and the battery cells 110 are accommodated within the box. The side plates 121a and the end plate 123 may be connected to each other by screws, welding or mechanical groove-protrusion coupling. The outer surfaces of the reinforcing plate 122a may be respectively coupled to the two side plates 121a, for example, through welding. The reinforcing plate 122a may be positioned between at least two of the battery cells 110 in the plurality of battery cells 110. The reinforcing plate 122a may be positioned between two of the battery cells 110 near the center or at the center of the plurality of battery cells 110, or may be positioned between any other two battery cells 110. Alternatively, a plurality of reinforcing plates 122a may be provided and positioned between different sets of two battery cells in the plurality of battery cells 110.

When the housing portion 120a includes iron, e.g., stainless steel, the weight of the battery module 100a may be decreased. However, deformation of a battery module 100a that is longer in length may be caused by impact. Accordingly, a battery module 100a according to an embodiment of the present invention includes the reinforcing plate 122a coupled to or fixed to a central portion of the side plates 121a in order to strengthen the housing portion 120a, thereby substantially solving this problem. The reinforcing plate 122a may be coupled to or fixed to the side plates 121a, for example, through welding, such as laser welding. However, welding produces high temperatures as a result of heat generated during the welding. Hence, in some embodiments, the battery cells 110 are positioned in the housing portion after the reinforcing plate 122a is coupled to or fixed to the side plates 121a, and the end plates 123 are connected to the side plates 121a. When the reinforcing plate 122a is coupled to or fixed to the side plates 121a through welding, the welding is difficult to perform when the reinforcing plate 122a and the side plates 121a are too thick. Therefore, the thickness of each of the reinforcing plate 122a and the side plates 121a may be identical to or thinner than the thicknesses of the end plates 123. For example, the reinforcing plate 122a and the side plates 121a may each have a thickness of 0.8 to 1 mm, and the end plate 123 may have a thickness of 1.5 mm or more.

In some embodiments, an insulative coating layer may be formed by coating an insulative material on at least one surface of the reinforcing plate 122a. For example, the surfaces of the reinforcing plate 122a that contact the battery cells 110 may be coated with an insulative coating so that the reinforcing plate 122a and the battery cell 110 are not unintentionally short-circuited with each other.

Figure 3:
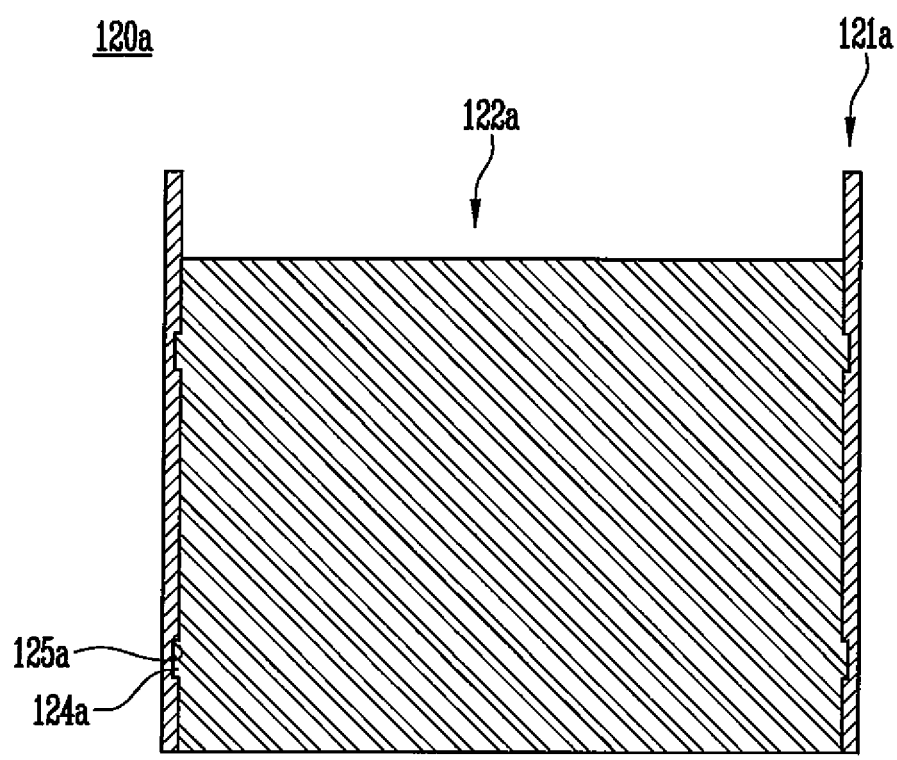
FIG. 3 is a sectional view of the housing portion of the battery module 100*a* of FIG. 2 taken along line A-A'.

FIG. 3 is a sectional view of the housing portion 120a of the battery module 110 shown in FIG. 2 taken along line A-A'. Hereinafter, a housing portion 120a according to an embodiment of the present invention will be described with reference to FIG. 3.

When the side plates 121a and the reinforcing plate 122a are simply connected to each other through welding, the coupling between the side plates 121a and the reinforcing plate 122a is relatively weak. Therefore, the side plates 121a and the reinforcing plate 122a may separate from each other as a result of an external force. However, in a battery module 100a according to an embodiment of the present invention, the coupling between the side plates 121a and the reinforcing plate 122a includes a protrusion 124a and a groove 125a, as shown in FIG. 3. This coupling enables firm attachment of the side plates 121a to the reinforcing plate 122a.

For example, the protrusion 124a may be formed on the reinforcing plate 122a, and the groove 125a may be formed in the side plates 121a. The protrusion 124a of the reinforcing plate 122a is inserted into the groove 125a of the side plates 121*a*. The area of attachment where the protrusion 124*a* of the reinforcing plate 122*a* engages the groove 125*a* of the side plates 121*a* may then be welded in order to more firmly couple or fix the reinforcing plate 122*a* to the side plates 121*a*. The protrusion 124*a* is first inserted into the groove 125*a*, and then the welding is performed. Hence, the attachment of the reinforcing plate 122*a* to the side plates 121*a* is firm. Further, by first engaging the protrusion 124*a* with the groove 125*a* before the welding the position of the reinforcing plate 122*a* is aligned and stabilized for the welding process.

There may be the same number of grooves 125*a* as there are protrusions 124*a*, and the shapes and positions of the grooves 125*a* may correspond to the shapes and positions of the protrusions 124*a*. As used herein, the term 'groove' is not limited to grooves, but also encompasses holes that extend completely through the side plates 121*a*. Although it has been described that the protrusion 124*a* is formed on the reinforcing plate 122*a*, and the groove 125*a* is formed in the side plates 121*a*, in some embodiments, the protrusion 124*a* may be formed on the side plates 121*a*, and the groove 125*a* may be formed in the reinforcing plate 122*a*.

Figure 4:
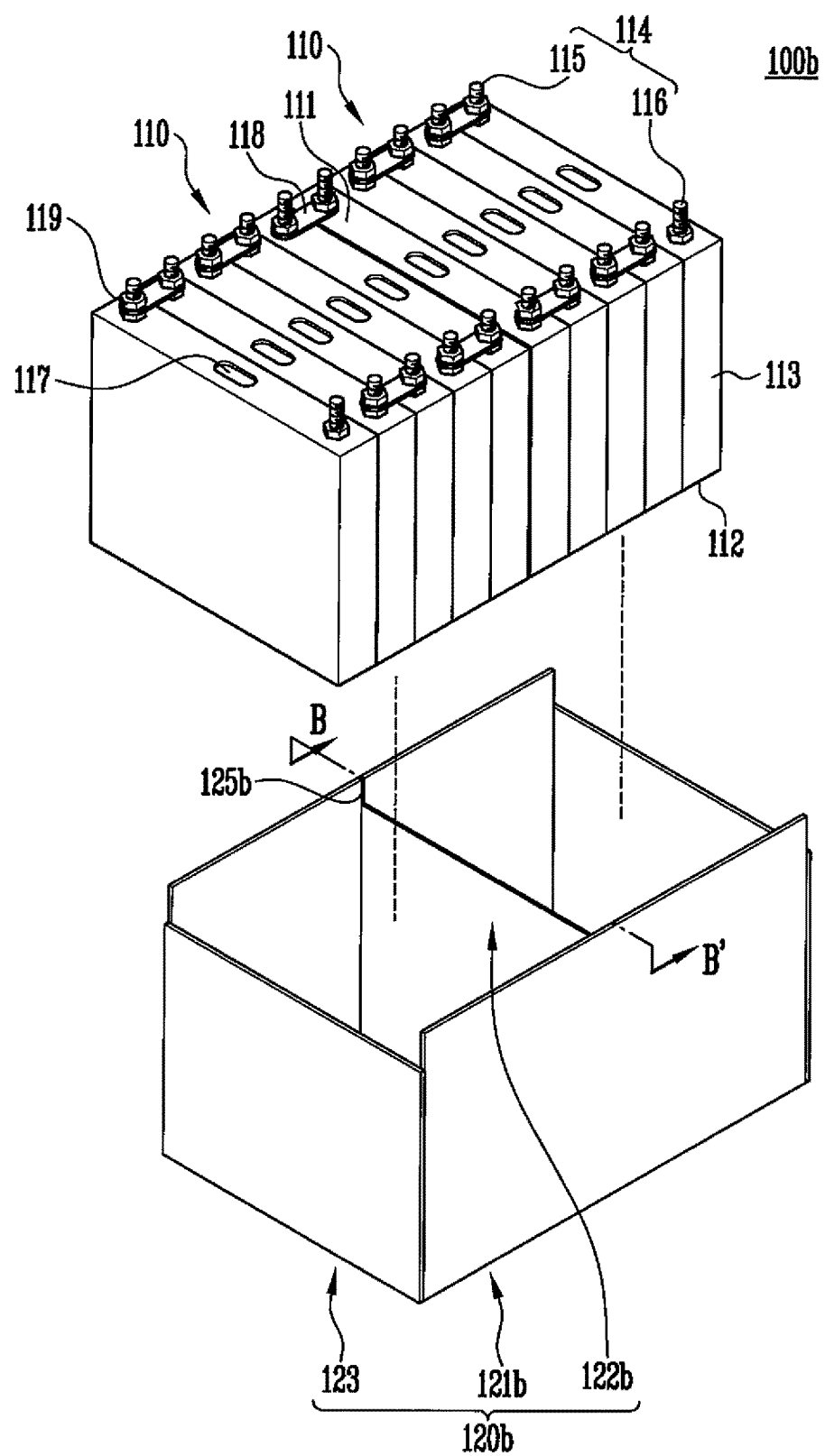
FIG. 4 is an exploded perspective view of a battery module according to another embodiment of the present invention.
Figure 5:
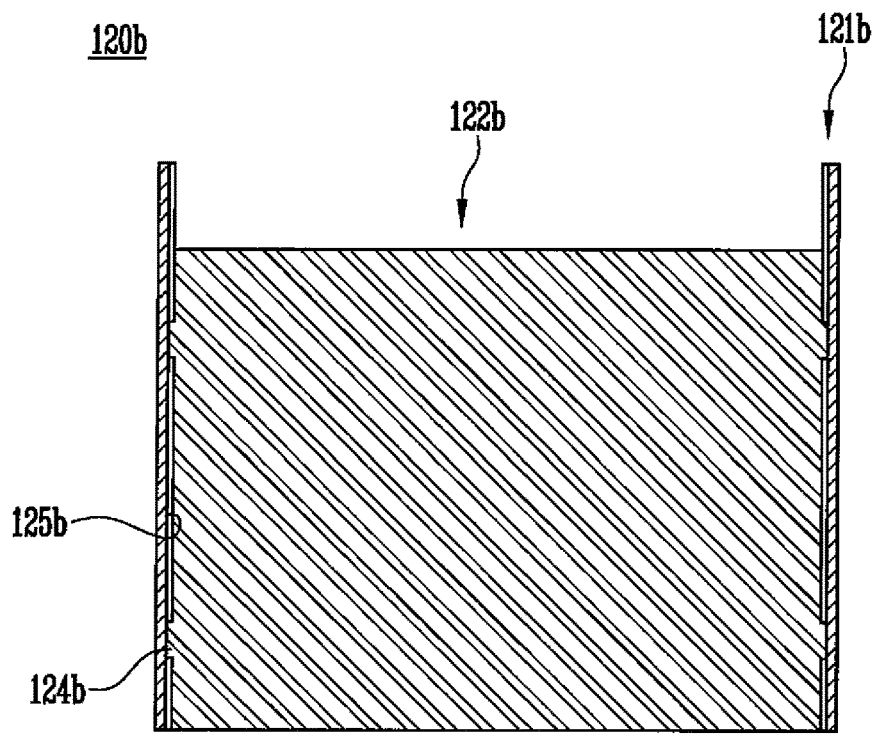
FIG. 5 is a sectional view of the housing portion of the battery module of FIG. 4 taken along line B-B'.
Figure 6:
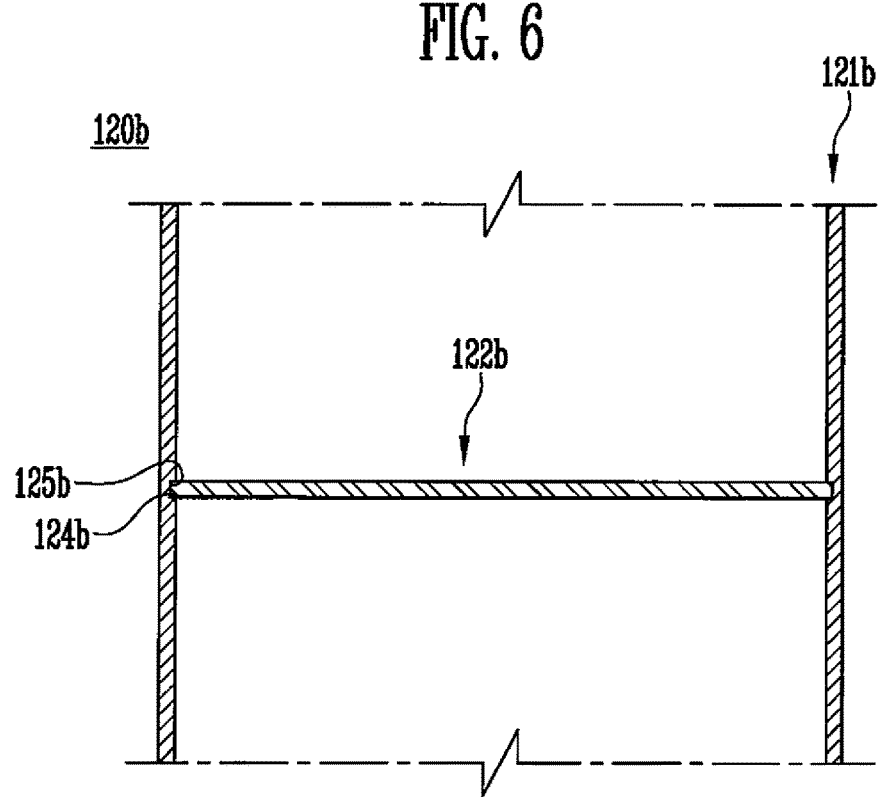
FIG. 6 is a plan view showing a portion of the housing portion of the battery module shown in FIG. 4.

FIG. 4 is an exploded perspective view of a battery module 100*b* according to another embodiment of the present invention. FIG. 5 is a sectional view of a housing portion 120*b* of the battery module 100*b* shown in FIG. 4 taken along line B-B'. FIG. 6 is a plan view showing a portion of the housing portion 120*b* of the battery module 100*b* shown in FIG. 4. Hereinafter, the battery module 100*b* according to an embodiment of the present invention will be described with reference to FIGS. 4 to 6. In this description, components that are identical to or correspond to those described above with respect to other embodiments are designated by like reference numerals, and their detailed descriptions will be omitted to avoid redundancy.

As shown in FIGS. 4 to 6, a battery module according to an embodiment of the present invention includes a housing portion 120*b*, which includes a reinforcing plate 122*b* welded to two side plates 121*b*. A long groove 125*b* is formed in the side plates 121*b*. Specifically, the groove 125*b* may be a long vertical groove (e.g., a slit shape). A protrusion 124*b* may be inserted into the groove 125*b*. Here, although two protrusions 124*b* are shown in FIG. 5 on one side of the reinforcing plate 122*b*, only one groove 125*b* is provided to engage both of two protrusions 124*b* that are on the same side of the reinforcing plate 122*b*. When the groove 125*b* is a long slit, the two side plates 121*b* are spaced apart from each other, and the reinforcing plate 122*b* is inserted between the side plates 121*b* in a downward direction starting from the upper portions of the side plates 121*b*, thereby making the manufacturing process of the housing portion 120*b* more convenient.

Figure 7:
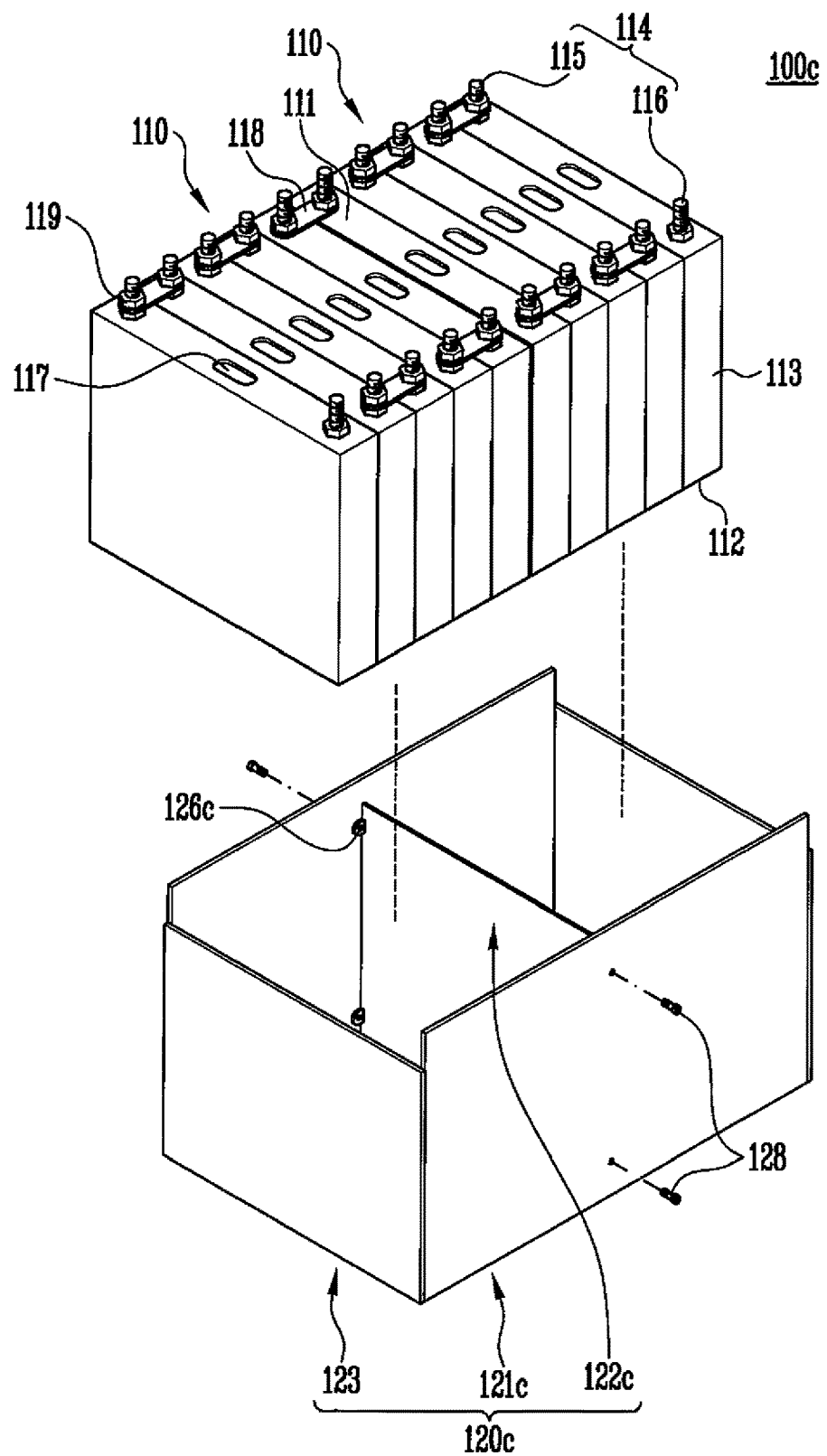
FIG. 7 is an exploded perspective view of a battery module according to still another embodiment of the present invention.
Figure 8:
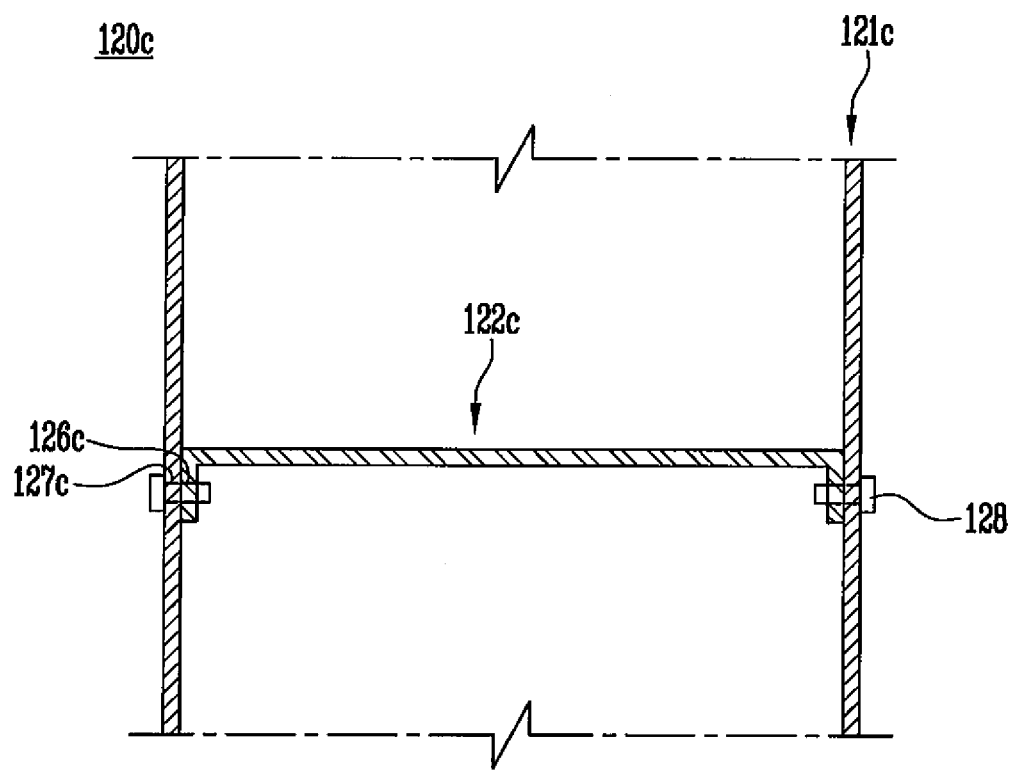
FIG. 8 is a plan view showing a portion of the housing portion of the battery module shown in FIG. 7.

FIG. 7 is an exploded perspective view of a battery module 100*c* according to still another embodiment of the present invention. FIG. 8 is a plan view showing a portion of the housing portion 120*c* of the battery module 100*c* shown in FIG. 7. Hereinafter, the battery module 100*c* according to an embodiment of the present invention will be described with reference to FIGS. 7 and 8. Here, components that are identical to or correspond to those described above in other embodiments are designated by like reference numerals, and their detailed descriptions will be omitted to avoid redundancy.

As shown in FIGS. 7 and 8, a battery module 100*c* according to an embodiment of the present invention includes a housing portion 120*c* that includes a reinforcing plate 122*c* coupled to or fixed to two side plates 121*c*. The reinforcing plate 122*c* and the side plates 121*c* may be coupled to or fixed to each other by screws. For example, a first coupling hole 126*c* may be formed in the reinforcing plate 122*c*, and a second coupling hole 127*c* may be formed in the side plates 121*c*. Then, a fixing member 128 is inserted into the first and second coupling holes 126*c* and 127*c*, thereby coupling or fixing the reinforcing plate 122*c* to the side plates 121*c*. Each of the first and second coupling holes 126*c* and 127*c* may be threaded, and the fixing member 128 may include a bolt, so that the reinforcing plate 122*c* and the side plates 121*c* can be firmly coupled to or fixed to each other by being screwed to each other.

Figure 9:
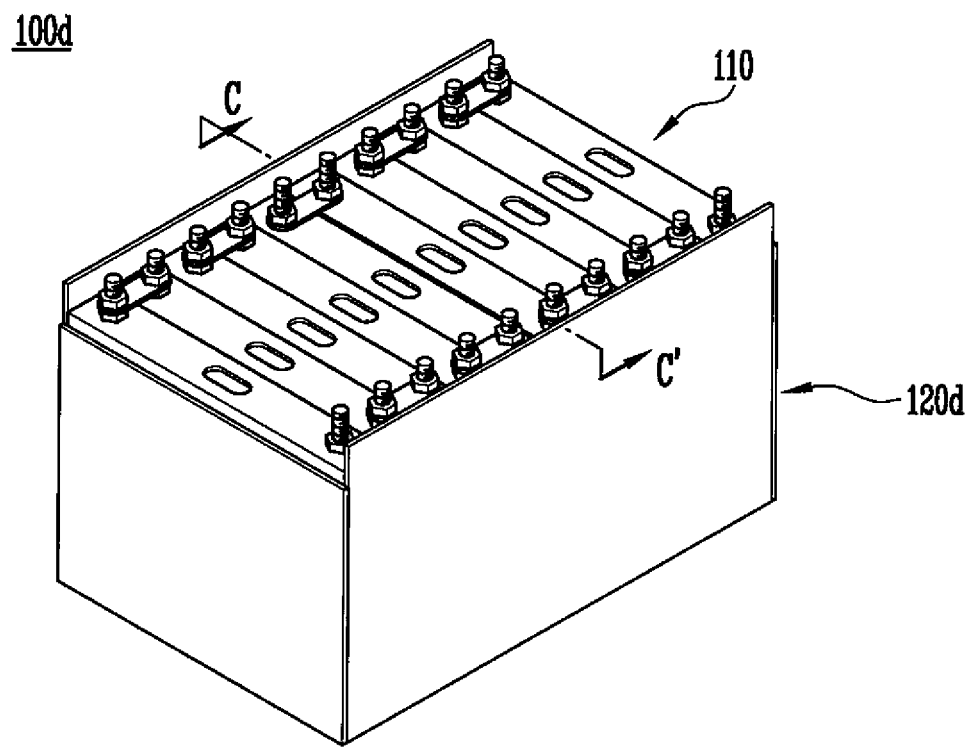
FIG. 9 is a perspective view of a battery module according to still another embodiment of the present invention.
Figure 10:
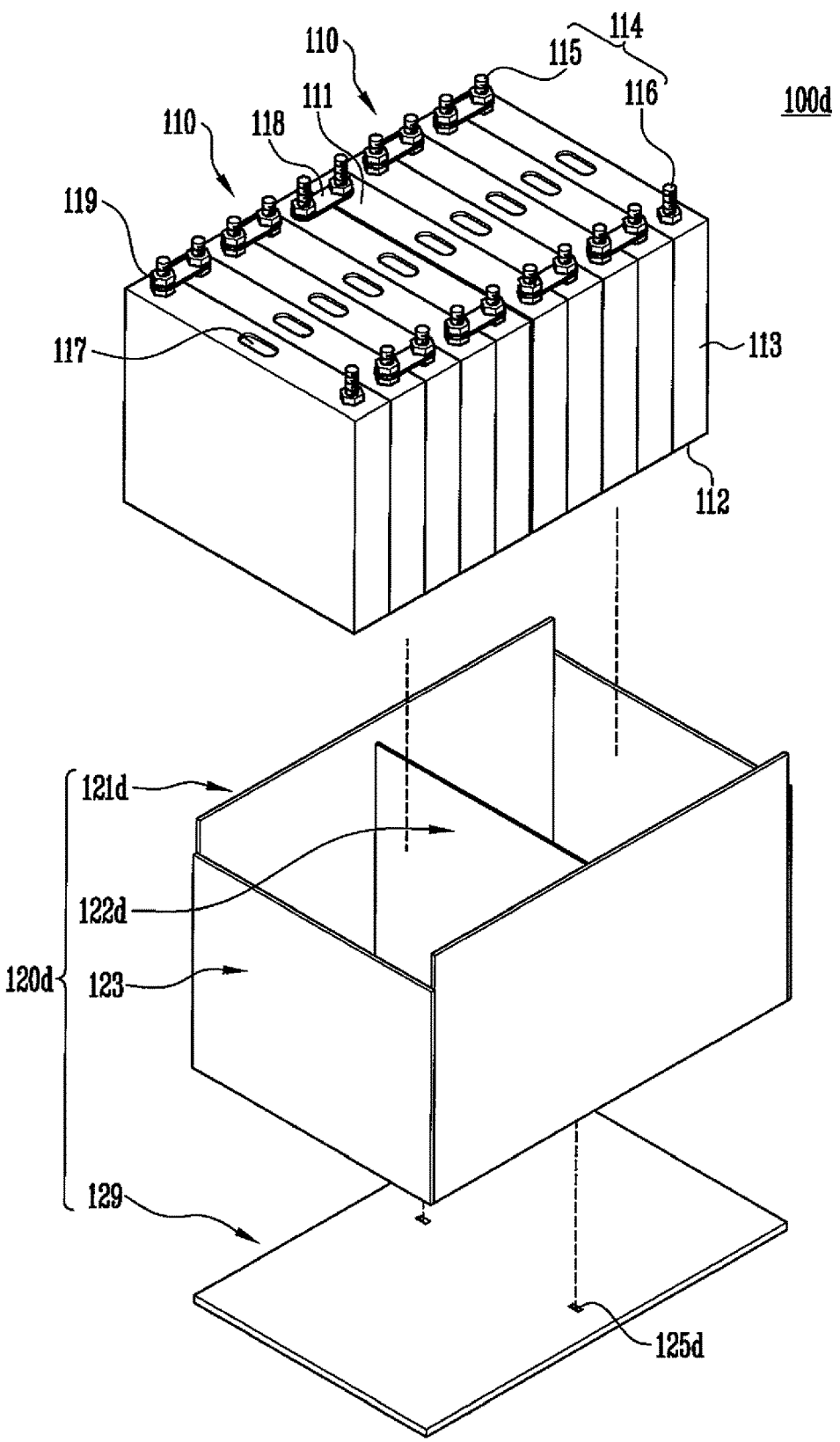
FIG. 10 is an exploded perspective view of the battery module shown in FIG. 9.
Figure 11:
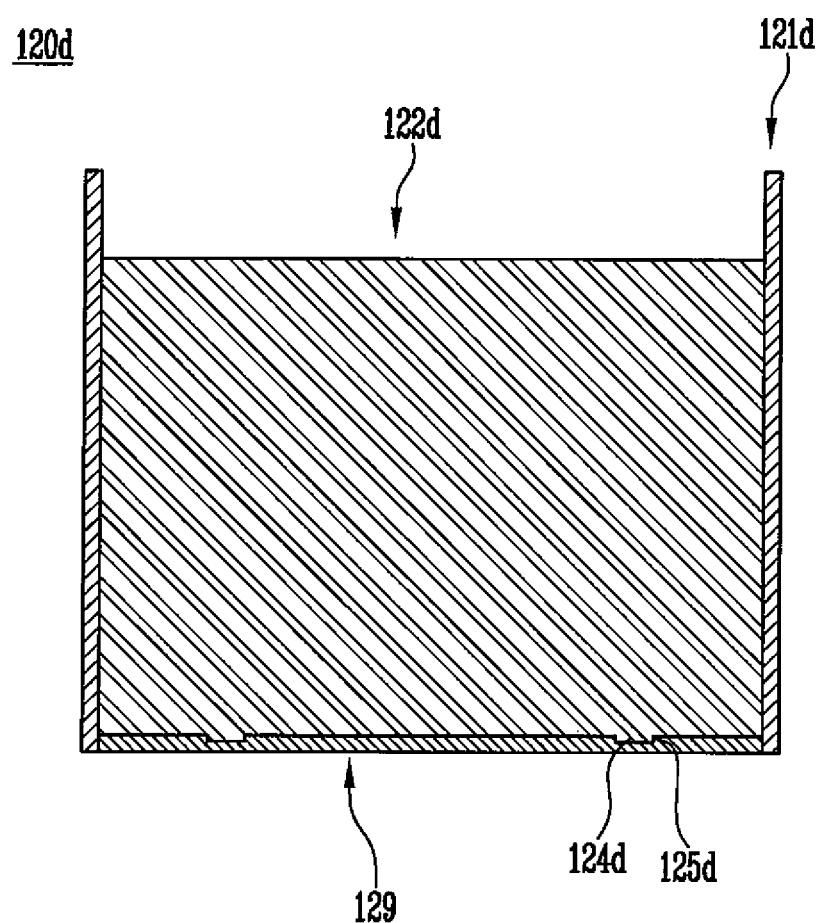
FIG. 11 is a sectional view of the housing portion of the battery module of FIG. 9 taken along line C-C'.

FIG. 9 is a perspective view of a battery module 100*d* according to still another embodiment of the present invention. FIG. 10 is an exploded perspective view of the battery module 100*c* shown in FIG. 9. FIG. 11 is a sectional view of a housing portion 120*d* of the battery module 100*d* shown in FIG. 9. Hereinafter, a battery module 100*d* according to an embodiment of the present invention will be described with reference to FIGS. 9 to 11. Here, components that are identical to or correspond to those described above with respect to other embodiments are designated by like reference numerals, and their detailed descriptions will be omitted to avoid redundancy.

As shown in FIGS. 9 to 11, a battery module 100*d* according to an embodiment of the present invention includes a plurality of battery cells 110 and a housing portion 120*d*. The battery module 100*d* may further include a bottom plate 129 in addition to two side plates 121*d*, a reinforcing plate 122*d* and two end plates 123. For example, the bottom plate 129 may cover a surface 112 of the plurality of battery cells 110. The bottom plate 129 may be connected to the end plates 123 or the side plates 121*d*. For example, the reinforcing plate 122*d* may be coupled to or fixed to the bottom plate 129, and the reinforcing plate 122*d* and the bottom plate 129 may be coupled to or fixed to each other. These couplings or connections can include, for example, simple welding, a protrusion 124*d* engaging a groove 125*d* with or without welding as shown in FIGS. 9 to 11, screws, etc.

Although the reinforcing plate has been described here as coupled to the bottom plate, the reinforcing plate may be coupled to both the side plates and the bottom plate. In this case, protrusions may be formed on three side surfaces of the reinforcing plate to enable coupling to both the side plates and the bottom plate. Welding may also be performed at the area where the protrusions engage the grooves formed in each of the two side plates and the bottom plate. The reinforcing plate and the bottom plate may also be coupled to or fixed to each other through simple welding or by being screwed together.

While certain exemplary embodiments of the present invention have been illustrated and described, those of ordinary skill in the art will understand that various modifications to the described embodiments can be made without departing from the spirit and scope of the appended claims, and equivalents thereof. Accordingly, the present invention is not limited to the specific embodiments described and illustrated herein.

What is claimed is:
1. A battery module, comprising:
a plurality of battery cells, each of the battery cells being arranged in a same direction and a same orientation; and
a housing for holding the battery cells, the housing comprising:

one or more reinforcing plates between two adjacent battery cells, the battery module having fewer of the one or more reinforcing plates than interspaces between adjacent battery cells in the plurality of battery cells, and the one or more reinforcing plates having a height that is equal to or less than a height of the battery cells in the plurality of battery cells;

a bus-bar electrically connecting electrode terminals of two adjacent battery cells, the bus-bar directly facing and extending across one of the one or more reinforcing plates;

first and second side plates positioned generally perpendicular to the one or more reinforcing plates, the one or more reinforcing plates being fixed to the first and second side plates, wherein a height of each of the first and second side plates is greater than the height of the battery cells in the plurality of battery cells; and first and second end plates, the first end plate being fixed to first ends of the first and second side plates, and the second end plate being fixed to second ends of the first and second side plates, wherein a thickness of the one or more reinforcing plates and thicknesses of the first and second side plates are each less than a thickness of each of the first and/or second end plates, and a height of each of the first and second end plates is less than a height of the battery cells in the plurality of battery cells, wherein one of the one or more reinforcing plates or the first and second side plates includes a groove, and the other of the one or more reinforcing plates or the first and second side plates includes a protrusion engaging the groove, and wherein the one or more reinforcing plates is welded to the first and second side plates at a region where the protrusion engages the groove.

2. The battery module of claim 1, wherein the one or more reinforcing plates is welded to the first and second side plates.

3. The battery module of claim 2, wherein the one or more reinforcing plates and the first and second side plates are made of the same material.

4. The battery module of claim 1, wherein the groove is a vertical slit in which the protrusion is configured to slide.

5. The battery module of claim 1, wherein the groove is a notch in which the protrusion is configured to fit.

6. The battery module of claim 1, wherein the two adjacent battery cells between which one of the one or more reinforcing plates is positioned are the two center-most battery cells in the plurality of battery cells.

7. The battery module of claim 1, wherein the thickness of the one or more reinforcing plates and the thicknesses of the first and second side plates are each about 0.8 mm to about 1 mm, and the thickness of each of the first and second end plates is about 1.5 mm or greater.

8. The battery module of claim 1, wherein the housing further comprises a bottom plate.

9. The battery module of claim 8, wherein the first and second side plates are fixed to the bottom plate.

10. The battery module of claim 8, wherein the one or more reinforcing plates is fixed to the bottom plate.

11. The battery module of claim 10, wherein the one or more reinforcing plates is welded to the bottom plate.

12. The battery module of claim 10, wherein one of the one or more reinforcing plates or the bottom plate includes a groove or hole, and the other of the one or more reinforcing plates and the bottom plate includes a protrusion, and the protrusion engages the groove or hole to thereby fix the one or more reinforcing plates to the bottom plate.

13. The battery module of claim 10, wherein the one or more reinforcing plates and the bottom plate are screwed together.

14. The battery module of claim 1, wherein the housing comprises stainless steel.

15. The battery module of claim 1, further comprising an insulative coating on the one or more reinforcing plates.

16. The battery module of claim 1, wherein the one or more reinforcing plates comprises a plurality of reinforcing plates, and each of the plurality of reinforcing plates is between a different set of two adjacent battery cells.

* * * * *